United States Patent
Wang et al.

(10) Patent No.: US 9,459,493 B1
(45) Date of Patent: Oct. 4, 2016

(54) PLATE HANGING DEVICE AND ALIGNMENT FILM COATING SYSTEM

(71) Applicants: BOE TECHNOLOGY GROUP CO., LTD., Beijing (CN); ORDOS YUANSHENG OPTOELECTRONICS CO., LTD., Ordos, Inner Mongolia (CN)

(72) Inventors: Chengxiang Wang, Beijing (CN); Huafeng Wang, Beijing (CN)

(73) Assignees: BOE TECHNOLOGY GROUP CO., LTD., Beijing (CN); ORDOS YUANSHENG OPTOELECTRONICS CO., LTD., Ordos, Inner Mongolia (CN)

( * ) Notice: Subject to any disclaimer, the term of this patent is extended or adjusted under 35 U.S.C. 154(b) by 0 days.

(21) Appl. No.: 14/744,523

(22) Filed: Jun. 19, 2015

(30) Foreign Application Priority Data

Mar. 20, 2015 (CN) .......................... 2015 1 0126299

(51) Int. Cl.
*B41F 27/12* (2006.01)
*G02F 1/1337* (2006.01)
*C23C 14/50* (2006.01)

(52) U.S. Cl.
CPC ......... *G02F 1/1337* (2013.01); *B41F 27/1231* (2013.01); *C23C 14/50* (2013.01)

(58) Field of Classification Search
CPC .................................................. B41F 27/1231
See application file for complete search history.

(56) References Cited

U.S. PATENT DOCUMENTS 3,358,598 A * 12/1967 Middleton .......... B41F 27/1275
101/378

* cited by examiner

*Primary Examiner* — Joshua D Zimmerman
(74) *Attorney, Agent, or Firm* — Nath, Goldberg & Meyer; Joshua B. Goldberg

(57) ABSTRACT

The invention provides a plate hanging device and an alignment film coating system. The plate hanging device includes a plate hanging part and a control part, wherein the plate hanging part is used for keeping the part of a transfer plate not coiled on a cylinder at a stretched state in a plate hanging process; the control part is used for controlling the cylinder to rotate to coil the transfer plate on the surface of the cylinder, the plate hanging device further includes a liquid spray part, the liquid spray part is connected with the control part and is controlled by the control part to uniformly spray a chemical reagent onto the surface to be jointed of the transfer plate to increase the friction between the transfer plate and the cylinder, and the surface to be jointed is a surface to be jointed with the cylinder of the transfer plate.

18 Claims, 2 Drawing Sheets

PLATE HANGING DEVICE AND ALIGNMENT FILM COATING SYSTEM

FIELD OF THE INVENTION

The present invention relates to the field of display technology, and in particular relates to a plate hanging device and an alignment film coating system.

BACKGROUND OF THE INVENTION

With the development of display technology and the progress of society, liquid crystal display technology has been more and more widely used by people and plays a vital role in industrial production and lives of people.

A TFT-LCD liquid crystal display panel is composed of an upper substrate, a lower substrate, liquid crystals, a driving circuit, a backlight module and other accessories. The upper substrate is composed of an upper glass substrate, a polaroid, a tricolor filter unit and an alignment film structure. The lower substrate is composed of a lower glass substrate, a pixel unit, a polaroid and an alignment film structure. The liquid crystals are filled in a gap formed by the upper and lower substrates. Both sides of the liquid crystals are in direct contact with alignment films for anchoring the liquid crystals. The alignment films on both sides of the upper and lower substrates are formed by friction alignment or UV irradiation alignment. Liquid crystal molecules filled in a cell are sequentially arranged by the alignment films in the absence of the action of an electric field and rotate by corresponding angles under the action of the electric field in the cell, so as to enable backlight to penetrate through the polaroid to achieve a display effect after the liquid crystal rotates.

The specific implementation manner of an alignment film coating process is as follows: coating alignment liquid on a transfer roller to transfer the alignment liquid onto a transfer plate through the transfer roller, transferring the alignment liquid onto a glass substrate through the transfer plate, and finally roasting the alignment liquid to form the film.

When coating the alignment film, the following problems exist in the prior art:

with the increase of transfer number, the transfer plate stretches, and with the stretch of the transfer plate, the distance, which is to be managed and controlled in process, from the edge of the alignment film to the display area of the liquid crystal panel changes accordingly to severely influence the normal display of the liquid crystal display panel.

At present, the stretch of the transfer plate is mainly suppressed by the adjustment of a transfer equipment end. At present, the stretch of the transfer plate is mainly suppressed in the following two manners: one is to suppress the stretch of the transfer plate by the adjustment of correction software, but the correction fails in a case of the stretched length exceeding a certain range. The other is to manually spray a chemical reagent between the transfer plate and a cylinder to increase the friction between the transfer plate and the cylinder, but the manual spray uniformity of the chemical reagent is poor, the efficiency is low, and additional splash of the chemical reagent is liable to happen to cause a risk of damaging the transfer surface of the transfer plate.

SUMMARY OF THE INVENTION

To solve the above-mentioned technical problems in the prior art, the present invention provides a plate hanging device and an alignment film coating system. The plate hanging device is provided with a liquid spray part to uniformly spray a chemical reagent onto a surface to be jointed of a transfer plate, in order to effectively prevent the transfer plate from stretching in a transfer process, such that the offset of the distance from the edge of an alignment film to the display area of a liquid crystal panel caused by the stretch of the transfer plate is effectively avoided, and the distance from the edge of the alignment film to the display area of the liquid crystal panel can be accurately managed and controlled, and accordingly, the service life of the transfer plate is prolonged and the use cost of the transfer plate is saved.

The present invention provides a plate hanging device, used for coiling a transfer plate on the surface of a cylinder, including a plate hanging part and a control part, wherein the plate hanging part is used for keeping the part of the transfer plate not coiled on the cylinder at a stretched state in a plate hanging process; the control part is used for controlling the cylinder to rotate to coil the transfer plate on the surface of the cylinder, the plate hanging device further includes a liquid spray part, the liquid spray part is connected with the control part and is controlled by the control part to uniformly spray a chemical reagent onto the surface to be jointed of the transfer plate to increase the friction between the transfer plate and the cylinder, and the surface to be jointed is a surface to be jointed with the cylinder of the transfer plate.

Preferably, the liquid spray part includes a container, at least one spray head, a pressure device and a liquid supply pipeline used for communicating the container with the at least one spray head; the pressure device is respectively connected with the control part and the container;

the container is used for containing the chemical reagent;

the at least one spray head is used for spraying the chemical reagent onto the surface to be jointed of the transfer plate;

the pressure device is controlled by the control part to apply a pressure into the container, for enabling the chemical reagent in the container to flow to the at least one spray head through the liquid supply pipeline under the action of the pressure.

Preferably, the speed of the at least one spray head for spraying the chemical reagent is in direct proportion to the pressure applied by the pressure device into the container;

rotating speed of the cylinder is in direct proportion to the speed of the at least one spray head for spraying the chemical reagent.

Preferably, the at least one spray head includes a plurality of spray heads, all of the plurality of spray heads are arranged above the cylinder, and the plurality of spray heads are arranged at equal intervals along a direction parallel to the axial line of the cylinder; the plurality of spray heads are arranged to face the surface to be jointed of the transfer plate.

Preferably, the pressure device includes a pressure source and an air supply pipeline, and two ends of the air supply pipeline are respectively connected with the pressure source and the container; the pressure source is used for generating the pressure and transferring the pressure into the container through the air in the air supply pipeline.

Preferably, the control part includes a first control module, a second control module and a matching module, and the first control module is used for controlling power generated by a power mechanism driving the cylinder to rotate; the second control module is used for controlling the pressure generated by the pressure source; the matching module is used for matching the power with the pressure to form a direct proportion relationship between the rotating speed of the cylinder and the speed of the at least one spray head for spraying the chemical reagent.

Preferably, the plate hanging part includes a tension source and a moving belt, position of the tension source is fixed, two ends of the moving belt are respectively connected with the tension source and a tail end edge of the transfer plate, and the moving belt can stretch or contract relative to the tension source; a starting end edge of the transfer plate is fixed on the cylinder;

the tension source is used for generating a tension and transferring the tension onto the transfer plate through the moving belt, for consistently keeping the part of the transfer plate not coiled on the cylinder at the stretched state.

Preferably, the control part further includes a detection module and a third control module, the detection module is used for detecting the real-time state of the part of the transfer plate not coiled on the cylinder; the third control module is used for controlling the tension source to generate a tension capable of consistently keeping the part of the transfer plate not coiled on the cylinder at the stretched state according to the detection result of the detection module.

Preferably, the third control module is further used for controlling the tension source to pull back the moving belt to the position where the tension source is located after completely coiling the transfer plate on the surface of the cylinder.

The present invention further provides an alignment film coating system, including the above-mentioned plate hanging device.

The present invention has the beneficial effects that, the plate hanging device provided by the present invention is provided with the liquid spray part to uniformly spray the chemical reagent onto the surface to be jointed of the transfer plate, the uniformly sprayed chemical reagent can increase the friction between the transfer plate and the cylinder, in order to prevent easy relative movement of the transfer plate and the cylinder after the plate hanging operation is completed and effectively prevent the transfer plate from stretching in a transfer process, such that the offset of the distance from the edge of the alignment film to the display area of the liquid crystal panel caused by the stretch of the transfer plate is effectively avoided, and the distance from the edge of the alignment film to the display area of the liquid crystal panel can be accurately managed and controlled, and accordingly, the service life of the transfer plate is prolonged and the use cost of the transfer plate is saved. Meanwhile, due to the liquid spray part, the spray efficiency of the chemical reagent is improved, so that the plate hanging efficiency is improved.

According to the alignment film coating system provided by the present invention, by adopting the above-mentioned plate hanging device, the coating efficiency and the coating yield of the alignment film coating system are improved.

REFERENCE MARKS 1. plate hanging part; 11. tension source; 2. control part; 21. first control module; 22. second control module; 23. matching module; 24. detection module; 25. third control module; 3. liquid spray part; 31. container; 32. spray head; 33. pressure device; 331. pressure source; 332. air supply pipeline; 34. liquid supply pipeline; 4. transfer plate; 41. surface to be jointed; 5. cylinder.

DETAILED DESCRIPTION OF THE EMBODIMENTS

In order that those skilled in the art can better understand the technical solutions of the present invention, a further detailed description of the plate hanging device and the alignment film coating system provided by the present invention will be given below in combination with the accompanying drawings and the specific implementations.

Embodiment 1

Figure 1:
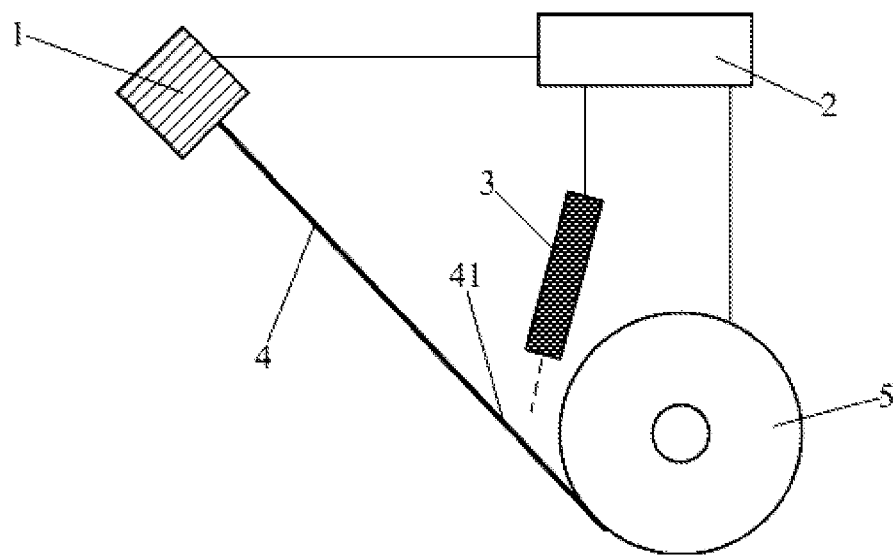
FIG. 1 is a schematic diagram of a structure of a plate hanging device in an embodiment 1 of the present invention.
Figure 2:
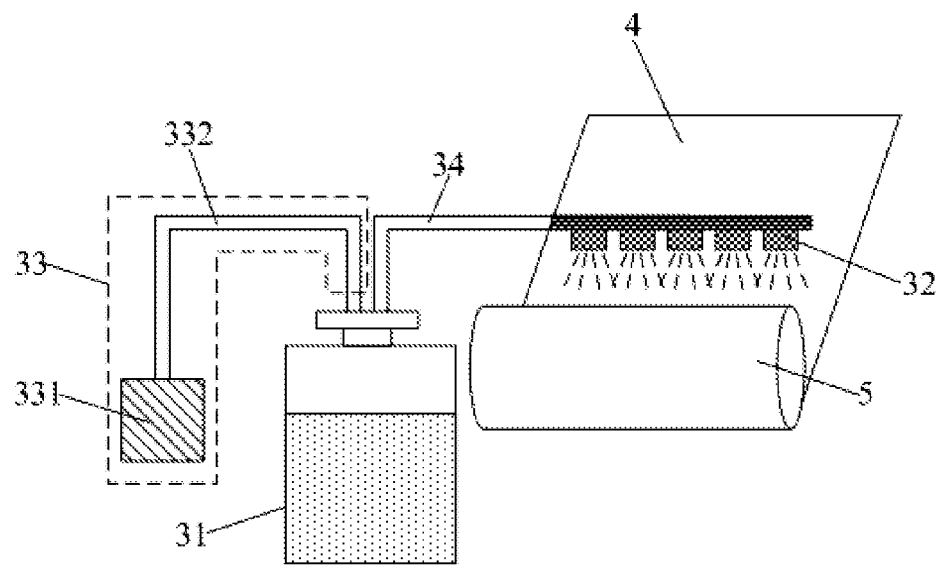
FIG. 2 is a schematic diagram of a structure of a liquid spray part in FIG. 1.

The embodiment provides a plate hanging device, as shown in FIG. 1 and FIG. 2, used for coiling a transfer plate 4 on the surface of a cylinder 5, including a plate hanging part 1 and a control part 2, wherein the plate hanging part 1 is used for keeping the part of the transfer plate 4 not coiled on the cylinder 5 at a stretched state in a plate hanging process; the control part 2 is used for controlling the cylinder 5 to rotate to coil the transfer plate 4 on the surface of the cylinder 5, the plate hanging device further includes a liquid spray part 3, the liquid spray part 3 is connected with the control part 2 and is controlled by the control part 2 to uniformly spray a chemical reagent onto the surface 41 to be jointed of the transfer plate 4, and the surface 41 to be jointed is a surface, which is to be jointed with the cylinder 5, of the transfer plate 4.

The liquid spray part 3 is arranged to uniformly spray the chemical reagent onto the surface 41 to be jointed of the transfer plate 4, the uniformly sprayed chemical reagent can increase the friction between the transfer plate 4 and the cylinder 5, in order to prevent easy relative movement between the transfer plate 4 and the cylinder 5 after the plate hanging operation is completed and effectively prevent the transfer plate 4 from stretching in the transfer process, such that the offset of the distance from the edge of an alignment film to the display area of a liquid crystal panel caused by the stretch of the transfer plate 4 is effectively avoided, and the distance from the edge of the alignment film to the display area of the liquid crystal panel can be accurately managed and controlled, and accordingly, the service life of the transfer plate 4 is prolonged and the use cost of the transfer plate 4 is saved. Meanwhile, due to the liquid spray part 3, the spray efficiency of the chemical reagent is improved, so that the plate hanging efficiency is improved.

In the embodiment, the liquid spray part 3 includes a container 31, at least one spray head 32, a pressure device 33 and a liquid supply pipeline 34 used for communicating the container 31 with the spray head 32; the pressure device 33 is respectively connected with the control part 2 and the container 31. The container 31 is used for containing the chemical reagent; the spray head 32 is used for spraying the chemical reagent onto the surface 41 to be jointed of the transfer plate 4; the pressure device 33 is controlled by the control part 2 to apply a pressure into the container 31, for enabling the chemical reagent in the container 31 to flow to the spray head 32 through the liquid supply pipeline 34 under the action of the controlled pressure.

In the embodiment, the speed of the spray head 32 for spraying the chemical reagent is in direct proportion to the pressure applied by the pressure device 33 into the container 31; the rotating speed of the cylinder 5 is in direct proportion to the speed of the spray head 32 for spraying the chemical reagent. Due to this arrangement, the speed of the spray head 32 for spraying the chemical reagent can be controlled by controlling the pressure applied by the pressure device 33 into the container 31; meanwhile, the rotating speed of the cylinder 5 and the speed of the spray head 32 for spraying the chemical reagent can be controlled to uniformly spray the chemical reagent onto the surface 41 to be jointed.

In the embodiment, the at least one spray head 32 includes a plurality of spray heads 32, all of the plurality of spray heads 32 are arranged above the cylinder 5, and the plurality of spray heads 32 are arranged at equal intervals along a direction parallel to the axial line of the cylinder 5; the plurality of spray heads 32 are arranged to face the surface 41 to be jointed of the transfer plate 4. Due to this arrangement, it can be further ensured that the chemical reagent sprayed by the spray heads 32 onto the surface 41 to be jointed of the transfer plate 4 is more uniform.

In the embodiment, the pressure device 33 includes a pressure source 331 and an air supply pipeline 332, and two ends of the air supply pipeline 332 are respectively connected with the pressure source 331 and the container 31; the pressure source 331 is used for generating the pressure and transferring the pressure into the container 31 through the air in the air supply pipeline 332.

Figure 3:
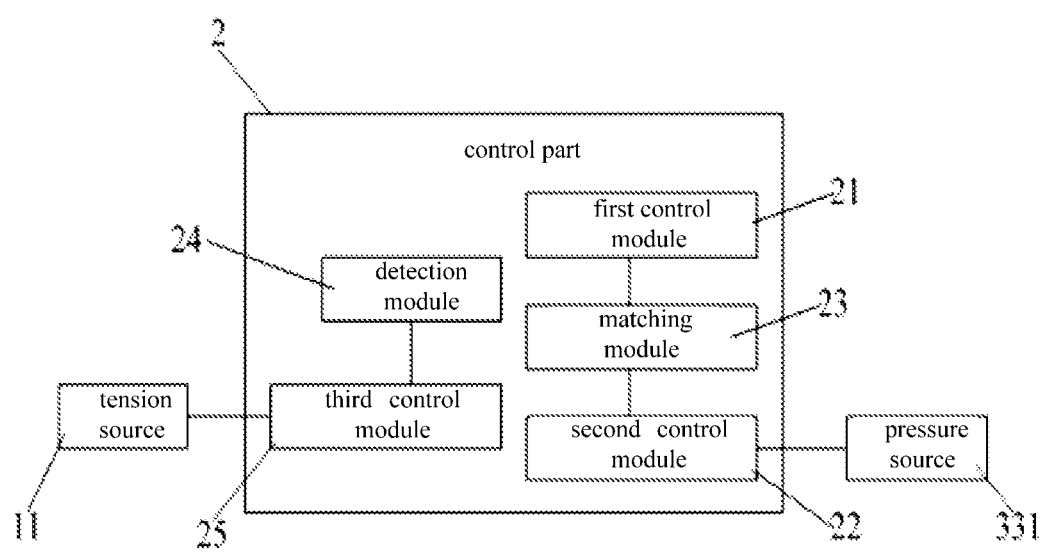
FIG. 3 is a block diagram of a control principle of a control part in FIG. 1.

In the embodiment, as shown in FIG. 3, the control part 2 includes a first control module 21, a second control module 22 and a matching module 23, and the first control module 21 is used for controlling power generated by a power mechanism driving the cylinder 5 to rotate; the second control module 22 is used for controlling the pressure generated by the pressure source 331; the matching module 23 is used for matching the power with the pressure to form a direct proportion relationship between the rotating speed of the cylinder 5 and the speed of the spray head 32 for spraying the chemical reagent. Due to this arrangement, it can be ensured that in the plate hanging process, with the rotation of the cylinder 5, the chemical reagent sprayed by the spray head 32 onto the surface 41 to be jointed of the transfer plate 4 is consistently uniform.

In the embodiment, the plate hanging part 1 includes a tension source 11 and a moving belt, the position of the tension source 11 is fixed, two ends of the moving belt are respectively connected with the tension source 11 and the tail end edge of the transfer plate 4, and the moving belt can stretch or contract relative to the tension source 11; the starting end edge of the transfer plate 4 is fixed on the cylinder 5. The tension source 11 is used for generating a tension and transferring the tension onto the transfer plate 4 through the moving belt, for consistently keeping the part of the transfer plate 4 not coiled on the cylinder 5 at the stretched state. Due to the arrangement of the plate hanging part 1, it can be ensured that in the plate hanging process, the transfer plate 4 is consistently kept at the stretched state when being jointed with the cylinder 5, so as to ensure tighter joint of the transfer plate 4 and the cylinder 5, and no gap exists between the transfer plate and the cylinder after the two components are jointed, so that the transfer plate 4 can be prevented from stretching in the transfer process.

In the embodiment, the control part 2 further includes a detection module 24 and a third control module 25, the detection module 24 is used for detecting the real-time state of the part of the transfer plate 4 not coiled on the cylinder 5; the third control module 25 is used for controlling the tension source 11 to generate the tension capable of consistently keeping the part of the transfer plate 4 not coiled on the cylinder 5 at the stretched state according to the detection result of the detection module 24. Since the control part 2 is provided with the detection module 24 and the third control module 25, the plate hanging part 1 can be controlled to consistently stretch the transfer plate 4 in the plate hanging process, so as to ensure tighter joint of the transfer plate 4 and the cylinder 5, and no gap exists between the transfer plate and the cylinder after the two components are jointed, so that the transfer plate 4 can be prevented from stretching in the transfer process.

In the embodiment, the third control module 25 is further used for controlling the tension source 11 to pull back the moving belt to the position where the tension source 11 is located after completely coiling the transfer plate 4 on the surface of the cylinder 5, for facilitating the stretching operation of the moving belt on the transfer plate 4 in the next plate hanging process.

The specific plate hanging process of the plate hanging device in the embodiment is as follows: the starting end of the transfer plate 4 is fixed on the cylinder 5 at first; one end of the moving belt is connected with the tail end edge of the transfer plate 4, and the transfer plate 4 is kept at the stretched state; when controlling the cylinder 5 to rotate, the control part 2 controls the liquid spray part 3 to spray the chemical reagent onto the surface 41 to be jointed of the transfer plate 4, since the rotating speed of the cylinder 5 is in direct proportion to the liquid spray speed of the liquid spray part 3, after being uniformly sprayed with the chemical reagent, the surface 41 to be jointed of the transfer plate 4 is jointed with the cylinder 5, when the entire transfer plate 4 is jointed on the cylinder 5, the moving belt is disconnected with the tail end edge of the transfer plate 4, and finally the tail end of the transfer plate 4 is fixed on a corresponding position of the cylinder 5. The plate hanging operation is completed.

In the above-mentioned plate hanging process, the chemical reagent can increase the relative adsorption force between the transfer plate 4 and the cylinder 5 to effectively prevent the transfer plate 4 from stretching in the transfer process, such that the offset of the distance from the edge of the alignment film to the display area of the liquid crystal panel caused by the stretch of the transfer plate 4 is effectively avoided, and the distance from the edge of the alignment film to the display area of the liquid crystal panel can be accurately managed and controlled, and accordingly, the service life of the transfer plate 4 is prolonged and the use cost of the transfer plate 4 is saved.

The beneficial effects of the embodiment 1 are as follows: the plate hanging device in the embodiment 1 is provided with the liquid spray part to uniformly spray the chemical reagent onto the surface to be jointed of the transfer plate, the uniformly sprayed chemical reagent can increase the friction between the transfer plate and the cylinder, in order to prevent easy relative movement of the transfer plate and the cylinder after the plate hanging operation is completed and effectively prevent the transfer plate from stretching in a transfer process, such that the offset of the distance from the edge of the alignment film to the display area of the liquid crystal panel caused by the stretch of the transfer plate is effectively avoided, and the distance from the edge of the alignment film to the display area of the liquid crystal panel can be accurately managed and controlled, and accordingly, the service life of the transfer plate is prolonged and the use cost of the transfer plate is saved. Meanwhile, due to the liquid spray part, the spray efficiency of the chemical reagent is improved, so that the plate hanging efficiency is improved.

Embodiment 2

The embodiment provides an alignment film coating system, including the above-mentioned plate hanging device.

By adopting the plate hanging device in the embodiment 1, the coating efficiency and the coating yield of the alignment film coating system are improved.

It can be understood that, the above implementations are merely exemplary implementations adopted for describing the principle of the present invention, rather than limiting the present invention. Those of ordinary skill in the art can make various variations and improvements without departing from the spirit and essence of the present invention, and these variations and improvements are encompassed within the protection scope of the present invention.

The invention claimed is:

1. A plate hanging device, used for coiling a transfer plate on the surface of a cylinder, comprising a plate hanging part and a control part, wherein the plate hanging part is used for keeping the part of the transfer plate not coiled on the cylinder at a stretched state in a plate hanging process; the control part is used for controlling the cylinder to rotate to coil the transfer plate on the surface of the cylinder, the plate hanging device further comprises a liquid spray part, the liquid spray part is connected with the control part and is controlled by the control part to uniformly spray a chemical reagent onto the surface to be jointed of the transfer plate to increase the friction between the transfer plate and the cylinder, and the surface to be jointed is a surface to be jointed with the cylinder of the transfer plate.

2. The plate hanging device of claim 1, wherein the liquid spray part comprises a container, at least one spray head, a pressure device and a liquid supply pipeline used for communicating the container with the at least one spray head; the pressure device is respectively connected with the control part and the container;

the container is used for containing the chemical reagent;
the at least one spray head is used for spraying the chemical reagent onto the surface to be jointed of the transfer plate;
the pressure device is controlled by the control part to apply a pressure into the container, for enabling the chemical reagent in the container to flow to the at least one spray head through the liquid supply pipeline under the action of the pressure.

3. The plate hanging device of claim 2, wherein the speed of the at least one spray head for spraying the chemical reagent is in direct proportion to the pressure applied by the pressure device into the container;

rotating speed of the cylinder is in direct proportion to the speed of the at least one spray head for spraying the chemical reagent.

4. The plate hanging device of claim 3, wherein the at least one spray head comprises a plurality of spray heads, all of the plurality of spray heads are arranged above the cylinder, and the plurality of spray heads are arranged at equal intervals along a direction parallel to the axial line of the cylinder; the plurality of spray heads are arranged to face the surface to be jointed of the transfer plate.

5. The plate hanging device of claim 3, wherein the pressure device comprises a pressure source and an air supply pipeline, and two ends of the air supply pipeline are respectively connected with the pressure source and the container; the pressure source is used for generating the pressure and transferring the pressure into the container through the air in the air supply pipeline.

6. The plate hanging device of claim 5, wherein the control part comprises a first control module, a second control module and a matching module, and the first control module is used for controlling power generated by a power mechanism driving the cylinder to rotate; the second control module is used for controlling the pressure generated by the pressure source; the matching module is used for matching the power with the pressure to form a direct proportion relationship between the rotating speed of the cylinder and the speed of the at least one spray head for spraying the chemical reagent.

7. The plate hanging device of claim 6, wherein the plate hanging part comprises a tension source and a moving belt, position of the tension source is fixed, two ends of the moving belt are respectively connected with the tension source and a tail end edge of the transfer plate, and the moving belt can stretch or contract relative to the tension source; a starting end edge of the transfer plate is fixed on the cylinder;

the tension source is used for generating a tension and transferring the tension onto the transfer plate through the moving belt, for consistently keeping the part of the transfer plate not coiled on the cylinder at the stretched state.

8. The plate hanging device of claim 7, wherein the control part further comprises a detection module and a third control module, the detection module is used for detecting the real-time state of the part of the transfer plate not coiled on the cylinder; the third control module is used for controlling the tension source to generate a tension capable of consistently keeping the part of the transfer plate not coiled on the cylinder at the stretched state according to the detection result of the detection module.

9. The plate hanging device of claim 8, wherein the third control module is further used for controlling the tension source to pull back the moving belt to the position where the tension source is located after completely coiling the transfer plate on the surface of the cylinder.

10. An alignment film coating system, comprising a plate hanging device used for coiling a transfer plate on the surface of a cylinder, wherein the plate hanging device comprises a plate hanging part and a control part, the plate hanging part is used for keeping the part of the transfer plate not coiled on the cylinder at a stretched state in a plate hanging process; the control part is used for controlling the cylinder to rotate to coil the transfer plate on the surface of the cylinder, the plate hanging device further comprises a liquid spray part, the liquid spray part is connected with the control part and is controlled by the control part to uniformly spray a chemical reagent onto the surface to be jointed of the transfer plate to increase the friction between the transfer plate and the cylinder, and the surface to be jointed is a surface to be jointed with the cylinder of the transfer plate.

11. The alignment film coating system of claim 10, wherein the liquid spray part comprises a container, at least one spray head, a pressure device and a liquid supply pipeline used for communicating the container with the at least one spray head; the pressure device is respectively connected with the control part and the container;

the container is used for containing the chemical reagent;
the at least one spray head is used for spraying the chemical reagent onto the surface to be jointed of the transfer plate;

the pressure device is controlled by the control part to apply a pressure into the container, for enabling the chemical reagent in the container to flow to the at least one spray head through the liquid supply pipeline under the action of the pressure.

12. The alignment film coating system of claim 11, wherein the speed of the at least one spray head for spraying the chemical reagent is in direct proportion to the pressure applied by the pressure device into the container;

rotating speed of the cylinder is in direct proportion to the speed of the at least one spray head for spraying the chemical reagent.

13. The alignment film coating system of claim 12, wherein the at least one spray head comprises a plurality of spray heads, all of the plurality of spray heads are arranged above the cylinder, and the plurality of spray heads are arranged at equal intervals along a direction parallel to the axial line of the cylinder; the plurality of spray heads are arranged to face the surface to be jointed of the transfer plate.

14. The alignment film coating system of claim 12, wherein the pressure device comprises a pressure source and an air supply pipeline, and two ends of the air supply pipeline are respectively connected with the pressure source and the container; the pressure source is used for generating the pressure and transferring the pressure into the container through the air in the air supply pipeline.

15. The alignment film coating system of claim 14, wherein the control part comprises a first control module, a second control module and a matching module, and the first control module is used for controlling power generated by a power mechanism driving the cylinder to rotate; the second control module is used for controlling the pressure generated by the pressure source; the matching module is used for matching the power with the pressure to form a direct proportion relationship between the rotating speed of the cylinder and the speed of the at least one spray head for spraying the chemical reagent.

16. The alignment film coating system of claim 15, wherein the plate hanging part comprises a tension source and a moving belt, position of the tension source is fixed, the two ends of the moving belt are respectively connected with the tension source and a tail end edge of the transfer plate, and the moving belt can stretch or contract relative to the tension source; a starting end edge of the transfer plate is fixed on the cylinder;

the tension source is used for generating a tension and transferring the tension onto the transfer plate through the moving belt, for consistently keeping the part of the transfer plate not coiled on the cylinder at the stretched state.

17. The alignment film coating system of claim 16, wherein the control part further comprises a detection module and a third control module, the detection module is used for detecting the real-time state of the part of the transfer plate not coiled on the cylinder; the third control module is used for controlling the tension source to generate a tension capable of consistently keeping the part of the transfer plate not coiled on the cylinder at the stretched state according to the detection result of the detection module.

18. The alignment film coating system of claim 17, wherein the third control module is further used for controlling the tension source to pull back the moving belt to the position where the tension source is located after completely coiling the transfer plate on the surface of the cylinder.

* * * * *